(12) United States Patent
Lauinger et al.

(10) Patent No.: US 8,901,773 B2
(45) Date of Patent: Dec. 2, 2014

(54) POWER SUPPLY SYSTEM AND PHOTOVOLTAIC DEVICE THEREFOR

(75) Inventors: Thomas Lauinger, Niedernberg (DE); Marcus Haeusler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 764 days.

(21) Appl. No.: 13/143,586

(22) PCT Filed: Dec. 30, 2009

(86) PCT No.: PCT/EP2009/068021
§ 371 (c)(1),
(2), (4) Date: Jul. 7, 2011

(87) PCT Pub. No.: WO2010/079112
PCT Pub. Date: Jul. 15, 2010

(65) Prior Publication Data
US 2011/0266876 A1 Nov. 3, 2011

(30) Foreign Application Priority Data
Jan. 12, 2009 (DE) .......................... 10 2009 004 679

(51) Int. Cl.
*H02J 7/35* (2006.01)
*H02J 1/00* (2006.01)
*H02N 6/00* (2006.01)
*H01L 31/042* (2014.01)
*H02J 5/00* (2006.01)

(52) U.S. Cl.
CPC ... *H02J 7/35* (2013.01); *H02J 5/00* (2013.01); *Y02E 10/566* (2013.01); *H02J 1/00* (2013.01)
USPC .............................. 307/71; 136/243; 136/251

(58) Field of Classification Search
USPC ....................................... 307/71; 136/243, 251
See application file for complete search history.

(56) References Cited

U.S. PATENT DOCUMENTS 8,330,301 B2 * 12/2012 Demetriades et al. ........ 307/150
2002/0024824 A1 * 2/2002 Reinold .......................... 363/17

OTHER PUBLICATIONS

Minder, R., "Very Large Scale PV-Systems—Zukunftsvisionen und Resultate der IEA-Diskussion," Forshungsverbund Sonnenenergie, Jan. 1, 2003, pp. 67-70, Berlin, Germany; cited in International Search Report, dated Jul. 5, 2010, issued in corresponding PCT/EP2009/068021.
Anonymous, "Datasheet PowerGate plus 500 kW Commercial Solar PV Inverter," Oct. 31, 2008, retrieved from the internet: URL:hhtp://www.affordable-solar.com/admin/w_72dpi_20081111124050.pdf [retrieved on Jun. 22, 2010]; cited in International Search Report, dated Jul. 5, 2010, issued in corresponding PCT/EP2009/068021.
International Search Report, dated Jul. 5, 2010, issued in corresponding PCT/EP2009/068021.
Preliminary Report on Patentability and Written Opinion, Jul. 5, 2010, issued in corresponding PCT/EP2009/068021.

* cited by examiner

*Primary Examiner* — Hal Kaplan
(74) *Attorney, Agent, or Firm* — Laurence A. Greenberg; Werner H. Stemer; Ralph E. Locher

(57) ABSTRACT

A power supply system (SYS) and a photovoltaic device (PVE) intended therefor and comprising a plurality of DC voltage-generating photovoltaic modules (PVM) are proposed, wherein the photovoltaic modules (PVM) for generating a DC voltage (Udc*) exceeding the withstand voltage or dialectric strength (Umodmax) of the photovoltaic modules (PVM) and suitable for the high-voltage DC transmission are connected in parallel or in series to one another, wherein the power supply system (SYS) comprises a converter substation (UFS) that can be connected to a power supply network (SVN) installed for users, and includes a high-voltage DC transmission power line (HGUE) so as to transmit in the high voltage range the DC voltage (Udc*) generated by the photovoltaic device (PVE) to the converter substation (UFS).

23 Claims, 2 Drawing Sheets

POWER SUPPLY SYSTEM AND PHOTOVOLTAIC DEVICE THEREFOR

Figure 1:
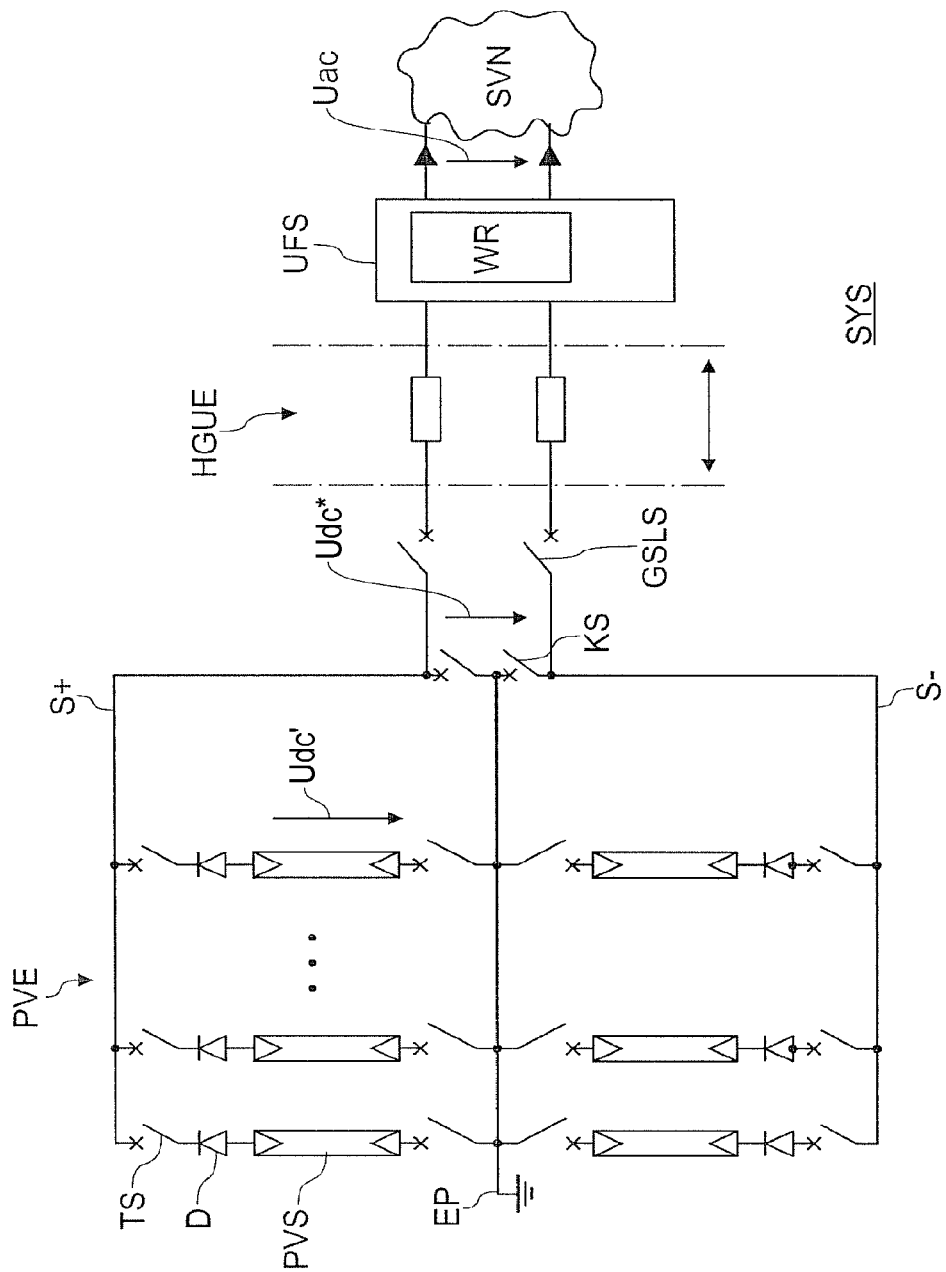

The present invention relates to a power supply system according to the preamble of claim 1 as well as a photovoltaic device provided therefor according to the preamble of the independent claim. In particular the invention relates to a power supply system and a photovoltaic device that is suitable for supplying power to consumers located far from or also close to the photovoltaic device.

Photovoltaic devices and plants are increasingly used in so-called photovoltaic power stations, which are mainly installed in regions receiving a large amount of sunlight and are intended to generate power centrally for the existing and often remote consumer-side power supply networks. Such photovoltaic devices are preferably constructed over a large area and are installed for example in desert regions in order to make a significant contribution to generating power from solar energy. These plants are also termed "Very Large Scale Photovoltaic Systems", abbreviated to VLS-PV systems, and are proposed for example in the article "very large scale PV-systems" by Dr Rudolf Minder in the volume of collected topics "FVS—Themen 2002" on pages 67 to 70 (published by the Forschungsverbund Sonnenenergie, Berlin, Germany, on the internet on the website: www.fv-sonnenergie.de). A modular construction of a plurality of PV modules is proposed there, although it is not described in more detail. Various transporting techniques, such as high-voltage direct current (DC). transmission, abbreviated to HVDC (or HGUE form the German term "Hochspannungs-Gleichstrom-Uebertragung"), are proposed for transmitting the electricity that is obtained.

It is therefore known, in power supply systems including large central power-generating photovoltaic power stations, to transport the generated power efficiently by means of a high-voltage DC transmission (HGUE) over long power lines to remote consumers or to consumer-side power networks. For this purpose the DC voltage generated on the generator side by PV modules is first of all converted by a power inverter to an AC voltage and then transformed by a transformer to a high AC voltage (first conversion). A central converter substation installed on the generator side converts this high alternating voltage (AC high voltage) to a DC high voltage (second conversion) and then feeds this into the HGUE power line or section. A further central converter substation for converting the DC high voltage to an AC high voltage is in turn located at the end of the HGUE power line in the vicinity of the consumers (third conversion). This AC high voltage is suitable for feeding to consumer-side power networks. Accordingly a conversion of the electrical energy is necessary on both the generator side and consumer side, i.e. a three-step conversion is required. This in turn requires a plurality of power inverters and in particular a central converter substation installed on the generating side, i.e. before power is fed into the HGUE power line. High investment costs are associated with this. Also, losses of electrical energy are associated with each conversion of the electrical voltage.

An object of the present invention is therefore to provide a power supply system of the type mentioned in the introduction as well as a photovoltaic device therefor, in which the disadvantages mentioned in the introduction are advantageously overcome. In particular the photovoltaic device should be designed so that the electrical energy generated by it can be transmitted very efficiently and with the least possible technical effort over a high-voltage DC transmission power line to the consumer side.

The aforementioned object is achieved by a power supply system having the features of claim 1 as well as by a photovoltaic device having the features of the independent claim.

It is therefore proposed that the photovoltaic modules for generating a DC voltage that exceeds the withstand voltage or dialectric strength of the photovoltaic modules and is suitable for a high-voltage DC transmission are connected in parallel and/or in series to one another, and that the power supply system comprises a converter substation that can be connected to a power supply network installed for consumers and includes a high-voltage DC transmission power line so as to transmit in the high-voltage range the DC voltage generated by the photovoltaic device to the converter substation. By means of this combination of features a sufficiently high DC voltage that can be fed directly into a high-voltage DC transmission power line and transmitted to the consumer side is already generated on the generating side at the site of the photovoltaic device. At the end of the HGUE power line it is then simply necessary to convert the transmitted DC voltage to a desired AC voltage. In particular the power inverters required on the generating side in conventional systems and HGUE rectifier stations are omitted. The DC voltage generated by the photovoltaic device can exceed by many times the withstand voltage (dialectic strength) of the individual photovoltaic modules, which is currently about at most 1 kV, and can for example be in a high voltage range from 1 kV to 2 MV.

The photovoltaic device is preferably designed so that in each case a first number of the photovoltaic modules are connected to a module block that is insulated against earth potential by insulating elements, for example ceramics or plastics insulators, and that in each case a second number of the module blocks form a module string that delivers at least a partial voltage of the generated DC voltage. In this way an electrically insulated supported arrangement of PV modules arranged in a block-wise manner is achieved, so that all PV modules, parts of the support arrangement as well as their immediate surroundings can be raised and/or charged to an arbitrary electrical potential. Also, the high voltage necessary for the HGUE transmission is generated solely by corresponding series connection and parallel connection of PV modules.

It is also advantageous if the photovoltaic modules connected in each case to a module block are mounted in a supported frame construction, in which case it may be arranged that the frame construction is connected by a potential bonding to the lowest, a medium or to the highest potential level of the module block. A potential bonding to the lowest or highest potential of a PV block is appropriate if the number of PV modules connected in series is arranged on a block so that the total voltage Upvb on a PV block remains below the dialectric strength of the individual PV modules. The term withstand voltage (dialectric strength) denotes here the maximum voltage that is allowed occur between the inner cell string and the module frame or the immediate surroundings of the module. Depending on the type of PV modules that are used, a positive or negative potential difference between the inner cell string of the modules and the module frame or frame construction can be adjusted by the nature of the potential bonding. This may be necessary in order possibly to avoid degradation effects of the modules or to observe corresponding recommendations or limits set by the manufacturers. A potential bonding to the medium potential of a PV block is then particularly appropriate if the series connection of the PV modules to a PV block is maintained at least until total voltages Upvb, which may lie above the dialectric strength of the individual PV modules (of for example 1 KV), occur on the individual PV blocks. In this way it is ensured that only a potential difference that corresponds at most to half the voltage generated by the respective PV block can occur between the individual PV modules and the supported arrangement. In this way double the maximum permitted voltage of an individual module can be generated on a PV block.

It may also be advantageous if the frame construction is formed as a two-dimensional structure (for example by a conducting grid). In this way the earth potential relative to the modules is screened and the latter are subjected only to the potential difference on the frame construction.

Preferably in each case at least two of the module strings are connected in series and a plurality of the series-connected module strings are connected in parallel so as to generate the DC voltage to be transmitted in the high-voltage range. In this case it is advantageous if the connection of the module strings comprises a first bus bar and a second bus bar, so that the generated DC voltage can be tapped via these bus bars.

It is furthermore advantageous if the converter substation at the end of the DC voltage transmission power line has a power inverter for converting the transmitted DC voltage to an AC voltage, the converter substation also being provided with a control circuit for a so-called "MPP Tracking" (MPP: Maximum Power Point). In this way the operating point of the power inverter is adjusted so that the maximum possible output can be taken from the PV device and can be transformed for feeding into the consumer-side network.

The system and the HGUE power line itself can also be designed as a single-pole system, so that only one bus bar as well as one line (overhead line or cable) are installed. The HGUE power line(s) can be designed for large distances, preferably using overhead lines, as well as for short distances, preferably using cables.

Figure 2:
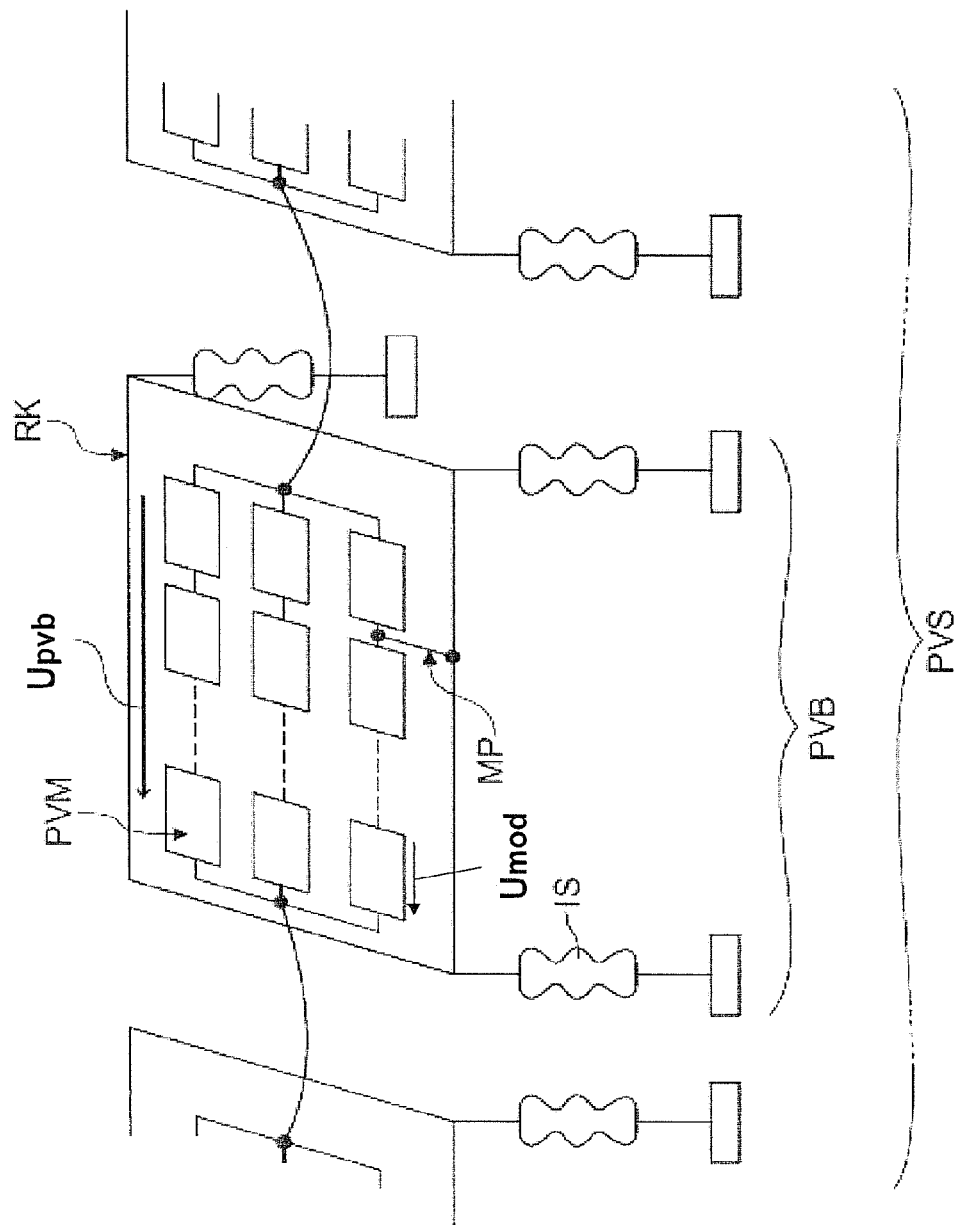

The invention and the advantages resulting therefrom are described in more detail hereinafter with the aid of an exemplary embodiment and with reference to the accompanying drawings, in which:

FIG. 1 shows schematically the structure of a power supply system according to the invention; and FIG. 2 shows the schematic construction of a photovoltaic device according to the invention.

FIG. 1 shows schematically the construction of a power supply system SYS according to the invention. The system SYS essentially comprises a photovoltaic device PVE, which is erected at a central point on the generator side, preferably in a sunny region, and supplies energy for feeding into a high-voltage DC transmission power line HGUE. The photovoltaic device PVE generates by virtue of its special design a DC voltage Udc*, which can lie in the high-voltage range of several hundred kV, and can be fed directly into the high-voltage DC transmission power line HGUE. The transmission power line HGUE can be hundreds or even thousands of kilometers long, and terminates on the consumer side at a central converter substation UFS. The transmission power line may however also run over a short distance, in which case the HGUE power line is preferably routed with a cable. The converter substation UFS comprises a power inverter WR and essentially converts the transmitted DC voltage Udc into a desired AC voltage Uac, so as then to feed this for example into a local power supply network SVN.

For the direct generation of a high DC voltage Udc* of for example 500 kV, the photovoltaic device PVE comprises a plurality of photovoltaic strings PVS connected in series and/or parallel, which in each case again comprise a plurality of PV modules.

The construction of a photovoltaic string PVS is illustrated in more detail with the aid of FIG. 2. As can be seen, an arrangement according to the invention of a plurality of PV modules PVM in the form of module blocks PVB is proposed for each string PVS, the module blocks being in each case mounted on a supported frame construction RK insulated against earth. Owing to the insulation the PV modules PVM can be raised to a very high electrical potential. Ceramics or plastics insulators IS for example are used for the insulation.

A string PVS having a total of N×M modules is produced by a parallel and series connection of in each case N modules PVM per block PVB and a preferably series connection of M blocks.

As FIG. 1 shows, in the installation or device PVE the photovoltaic strings PVS are then in turn connected in series and in parallel. In this connection, for example, in each case two strings PVS are connected in series and are connected by power diodes D as well as isolating switches TS to an upper bus bar S+ as well as to a lower bus bar S−. A plurality of these series-connected lines PVS are connected in parallel and joined to the bus bars S+ and S− so as finally to deliver on the output side a DC voltage Udc* in the desired high-voltage range. For a 600 MW arrangement for example, about Y=68 module strings are necessary. Accordingly a total of Y×N×M modules PCM are connected to one another in the device PVE. In addition to the isolating switches TS, there are also provided short-circuit switches KS for short-circuiting the bus bars S+, S−, as well as DC circuit breakers GSLS for isolating and disconnecting the high-voltage DC transmission power line (HGUE).

Each module string PVS can generate a maximum output voltage of Udc'=500 KV and can deliver a maximum current of up to 25 A. With a system characteristic having a space factor of ca. 70% this corresponds to a maximum individual output of 8.8 MW. A potential of max. +500 KV relative to earth potential EP is thus present on the upper bus bar S+. In turn, a negative potential of max. −500 KV (max. refers to the contribution of the voltage) relative to earth potential EP is present on the lower bus bar S−. All lines together can deliver a current of approximately max. 850 A to the HGUE power line. The DC voltage Udc* generated by the photovoltaic device PVE, which in this case is about 1000 KV, is tapped by corresponding switches TS and KS and is connected directly to the high-voltage DC transmission power line HGUE. By means of this arrangement a considerable saving as regards systems technology is already achieved on the generator side and before power is fed to the transmission line HGUE. In particular, the converters and transformers necessary in conventional systems as well as the generator-side transformer substation at the output of the HGUE power line are no longer required. In addition the cabling costs in the module field are also reduced, since almost exclusively small conductor cross-power lines can be used. A further advantage is that the overall efficiency of the system is raised, since all generator-side conversion and transformation losses are avoided.

A central converter substation UPS is located on the consumer side at the end of the HGUE transmission power line, which essentially comprises a DC/AC power inverter that converts the transmitted DC voltage Udc* to a desired AC voltage Uac. In addition the converter substation UFS also includes a control and monitoring device, which is designed to control the module field to the operating point required. In addition the cabling costs in the module field are also reduced, since almost exclusively small conductor cross-power lines can be used. A further advantage is that the overall efficiency of the system is raised, since all generator-side conversion and transformation losses are avoided. maximum output (so-called MPP tracking). In this way, depending on the varying electrical energy actually generated by the photovoltaic device PVE an adjustment of the operating point of the power inverter WR can be matched to a maximum power tapping.

In order to achieve on the generator side in the illustrated system SYS the direct feeding of a high DC voltage Udc*, in addition to interconnecting the strings PVS it is also in particular essential to construct each individual string PVS. As is shown with the aid of FIG. 2, each string PVS comprises a plurality of for example module blocks PVB, which in turn include a plurality of modules PVM, each block PVB being situated on a frame construction RK and insulated against earth potential by means of insulators IS. Due to the interconnection and supported arrangement the modules PVM situated in each case on the frame RK as well as also their immediate surroundings can be charged up to any arbitrary electrical potential. The voltage drop over each module block PVB is here for example 2 KV. The potential of the module blocks increases due to the series connection. For example, in the present case 250 blocks each at 2 KV are interconnected to give a total voltage of 500 KV (see also FIG. 1). In addition the frame construction RK is connected via a potential bonding MP to a potential level of the module block PVB, so as to apply the potential level of the supported arrangement and frame construction to this potential level of each block PVB. The potential bonding MP can be connected to the lowest, a medium or to the highest potential level of the module block. A potential bonding to the lowest or highest potential of a PV block is appropriate if the number of PV modules connected in series to a block is set so that on a PV block the total voltage Upvb remains below the withstand voltage (dialectric strength) of the individual PV modules. Depending on the type of PV modules that are employed, a positive or negative potential difference between the inner cell string of the modules and the module frame and frame construction can be adjusted by the nature of the potential bonding. This may be necessary in order for example to avoid degradation effects of the modules or to observe corresponding recommendations or limits set by the manufacturers. A potential bonding to the medium potential of a PV block is then particularly appropriate if the series connection of the PV modules to a PV block is maintained at least until total voltages Upvb, which can be above the dialectric strength of the individual PV modules (of for example 1 KV), exist on the individual PV blocks.

Umodmax denotes here the withstand voltage (dialectric strength) of an individual module. This specifies the maximum permissible potential difference that is allowed to exist between the inner cell string and thus the electrical connections of the module, and the module frame and its immediate surroundings.

Umod denotes here the actually existing voltage or potential difference between the inner cell string and thus the electrical connections of the module, and the module frame and its immediate surroundings. Umod is different for each module of a series connection to a PVB. The condition Umod<Umodmax must always apply.

The photovoltaic modules PVM employed here are preferably structurally identical and have roughly the same dialectric strength. If modules with different dialectric strengths were used, the situation could arise that the voltage Udc* exceeds the dialectric strengths of all employed modules PVM.

The power supply system described here can also be designed so that energy can be fed at a plurality of locally different points into an HGUE power line or line and tapped at a plurality of locally different points (so-called multipoint connection).

The possibility of the parallel connection of a plurality of module fields likewise described here can also be implemented so that power is fed at a plurality of points into the same HGUE line. The locations of the module fields can in this connection be many kilometres from one another. At the same time it should be ensured that the various fields are aligned as uniformly as possible and also have approximately the same exposure to the sun. For this reason the maximum possible distance of parallel-connected fields from one another is far less than 500 km.

The possibility of tapping energy at several points from the HGUE power line or lines then requires a converter substation with power inverters at each of these points. This can be completely appropriate if a plurality of consumer centres are to be supplied in any case along further transport paths. In this case it should be ensured that all converter substations are coupled in a technically controlled manner so as to operate the module field at the point of maximum output. Preferably in this case one of the stations acts as "master" station and assumes the MPP control and manages all further stations at operating points appropriately matched to one another, so that overall the best possible operating point for the PV power station is achieved.

Overall a direct and particularly cost-effective feeding of the generated energy to a high-voltage DC transmission power line is achieved with the arrangement according to the invention. On the consumer side the energy then simply has to be converted in a central converter substation to the local desired voltage. The invention is characterised in particular by a cost-effective systems technology that is beneficial both in terms investment costs and running costs.

List of Reference Symbols
SYS Power supply system
PVE Photovoltaic device
PVS Photovoltaic string (module string)
PVB Photovoltaic block (module block)
PVM Photovoltaic module
TS Isolating switch
KS Short-circuit switch
GSLS DC circuit breaker
D Diodes (diode packet)
EP Earth potential
S+, S− Bus bars
HGUE High-voltage DC transmission power line
UFS Converter substation
WR Power inverter (with MPP control)
SVN Power supply network (consumer-side)
Udc* Generated and transmitted DC voltage in the high-voltage range
Udc' Partial voltage (generator side, per string PVS)
Umodmax Withstand voltage (dialectric strength) of an individual module
Umod Actually existing voltage or potential difference (Umod<Umodmax)
Upvb Total voltage of a module block
Uac AC voltage (consumer side)
RK Frame construction for module block
IS Insulators for supported arrangement

The invention claimed is:

1. A power supply system with a photovoltaic device comprising a plurality of DC voltage-generating photovoltaic modules, wherein:
the photovoltaic modules are connected in parallel and/or in series to one another and thus generate a DC voltage that exceeds the withstand voltage of the photovoltaic modules and is suitable for high-voltage DC transmission, and the generated DC voltage is in a high-voltage range from 1 kV to 2 MV;

the power supply system includes at least one converter substation that can be connected to a power supply network installed for consumers and includes a high-voltage DC transmission power line that transmits in the high voltage range the DC voltage generated by the photovoltaic device to the converter substation.

2. The power supply system according to claim 1, wherein in each case a first number of photovoltaic modules are connected to a module block, which is insulated against earth potential by insulating elements, and that in each case a second number of the module blocks form a module string that delivers at least a partial voltage of the generated DC voltage.

3. The power supply system according to claim 2, wherein in each case at least two of the module strings are connected in series and a plurality of the series-connected module strings are connected in parallel, in order to generate the DC voltage suitable for the high-voltage DC transmission.

4. The power supply system according to claim 3, wherein the connection of the module strings comprises a first bus bar and a second bus bar, so that the DC voltage suitable for the high-voltage DC transmission can be tapped via the bus bars.

5. The power supply system according to claim 4, wherein the photovoltaic device comprises one or more short-circuit switches for short-circuiting the bus bars.

6. The power supply system according to claim 1, wherein the photovoltaic device or the power supply system comprises one or more DC circuit breakers for isolating the high-voltage DC transmission power line.

7. The power supply system according to claim 1, wherein the generated DC voltage exceeds by a multiple factor the withstand voltage of the photovoltaic modules.

8. The power supply system according to claim 2, wherein the photovoltaic modules connected in each case to a module block are installed in a supported frame construction.

9. The power supply system according to claim 8, wherein the frame construction is connected via a potential bonding to the lowest, a medium or to the highest potential level of the module block, in such a way that the potential difference between the individual modules and the frame construction does not exceed for any of the photovoltaic modules on a module block their withstand voltage.

10. The power supply system (SYS) according to claim 8, wherein the frame construction is formed as a two-dimensional structure, and in particular is formed as a conducting grid.

11. The power supply system according to claim 1, wherein the high-voltage DC transmission power line is at least a monopole and is routed by at least one overhead line and/or at least one cable.

12. The power supply system (SYS) according to claim 1, wherein the converter substation comprises a power inverter for converting the generated and transmitted DC voltage to an AC voltage.

13. The power supply system according to claim 12, wherein the converter substation or the power inverter comprises a control circuit that, depending on a varying electrical output generated by the photovoltaic device, matches an adjustment of the operating point of the power inverter to a maximum withdrawal of power.

14. A Photovoltaic device comprising a plurality of DC voltage-generating photovoltaic modules, characterised in that the photovoltaic modules are connected in parallel and/or in series to one another and thus generate a DC voltage that exceeds the withstand voltage of the photovoltaic modules and is suitable for a high-voltage DC transmission, wherein the generated DC voltage is in a high-voltage range from 1 kV to 2 MV.

15. The Photovoltaic device (PVE) according to claim 14, wherein in each case a first number of the photovoltaic modules are connected to a module block that is insulated against earth potential by insulating elements, and that in each case a second number of the module blocks form a module string that delivers at least a partial voltage of the generated DC voltage.

16. The Photovoltaic device (PVE) according to claim 15, wherein in each case at least two of the module strings are connected in series and a plurality of the series-connected module strings are connected in parallel so as to generate the DC voltage suitable for the high-voltage DC transmission.

17. The Photovoltaic device (PVE) according to claim 16, wherein the connection of the module strings comprises a first bus bar and a second bus bar, so that the DC voltage suitable for the high-voltage DC transmission can be tapped via the bus bars.

18. The Photovoltaic device (PVE) according to claim 17, wherein the photovoltaic device comprises one or more short-circuit switches for short-circuiting the bus bars.

19. The Photovoltaic device (PVE) according to claim 14, wherein the photovoltaic device comprises one or more DC circuit breakers for isolating the high-voltage DC transmission power line.

20. The Photovoltaic device (PVE) according to claim 14, wherein the generated DC voltage exceeds by a multiple factor the withstand voltage of the photovoltaic modules.

21. The Photovoltaic device according to claim 15, wherein the photovoltaic modules connected in each case to a module block are installed in a supported frame construction.

22. The Photovoltaic device (PVE) according to claim 21, wherein the frame construction is connected by a potential bonding to the lowest, a medium or to the highest potential level of the module block, in such a way that the potential difference between the individual modules and the frame construction does not exceed for any of the photovoltaic modules on a module block their withstand voltage.

23. The Photovoltaic device according to claim 21, wherein the frame construction is formed as a two-dimensional conducting grid.

\* \* \* \* \*